Patented Feb. 28, 1939

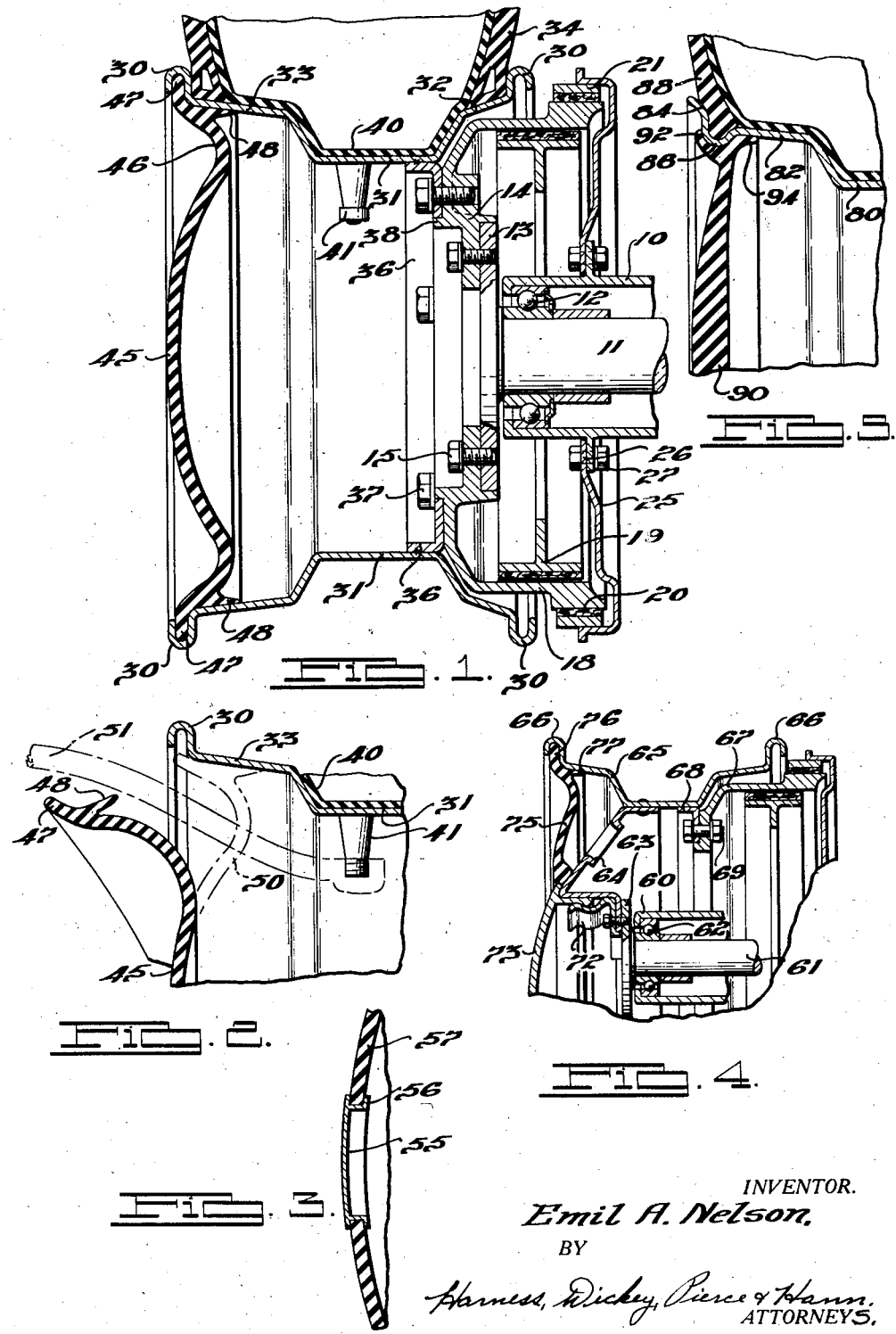

2,148,995

UNITED STATES PATENT OFFICE 2,148,995

WHEEL CONSTRUCTION

Emil A. Nelson, St. Clair Shores, Mich., assignor of fifty per cent to Dubois Young and twenty-five per cent to Frank W. Gay Application December 30, 1935, Serial No. 56,621

9 Claims. (Cl. 301—37)

This invention relates to wheel constructions. More particularly, it relates to a novel and unique wheel construction embodying a rim of unusually simple and novel construction and having a novel hub cap or closure member demountably secured therein.

This application is a continuation in part of applicant's prior co-pending application, Serial No. 51,367, filed November 25, 1935, for Automobiles in which some of the structural features shown and claimed herein are disclosed.

It is a general object of the present invention to provide a wheel construction which is unusually simple, neat appearing, easily assembled, and which is extremely simple and cheap to manufacture.

The present invention contemplates the provision of a wheel in which the conventional hub and spoke structure is entirely done away with, and in which the rim of the wheel is supported directly upon the brake drum.

It will be appreciated that wheels of the type disclosed herein, find particular utility in constructions where tires of relatively small diameter with respect to their size are used. In constructions of this general type, it is inherently essential that the width or axial length of the rim be relatively great in proportion to its diameter. These relative dimensions require that particularly effective means be provided for strengthening the rim structure as a whole in order that it may be formed of sheet metal of conventional thickness.

The present invention contemplates the utilization of a rim member of the drop center type, in which the drop center portion is offset substantially from the axial central plane of the rim. This construction provides flanges on either side of the drop center portion for receiving the beaded edges of the tire, one of these flanges being substantially wider than the other. This construction is particularly important inasmuch as it permits the utilization of a brake drum of a diameter greater than the drop center portion of the rim, mounted in connection therewith without increasing the axial length of the brake drum any more than would be necessary if a narrower rim were used. This construction further provides for a rim of relatively great width in which the tire is relatively easily removed therefrom, and in which the drop center portion may be of sufficiently narrow width to afford a maximum of strength.

Further, the present invention contemplates the provision of a rim construction in which the marginal flanges of the rim are reversely bent to provide channels presenting inwardly toward the axis of rotation of the rim, which greatly increase the strength of the rim as a whole.

Still further, the present invention contemplates the provision of a hub cap or closure member formed of deformable material, which has a marginal edge that is bifurcated, providing a portion that is adapted to engage the inner surface of the rim and a portion adapted to enter in and seat in the inwardly presenting channel.

Still further, the present invention contemplates the provision of a closure member construction, which is easily inserted into place, and which, due to its inherent structure and mounting, will have a normal tendency to expand radially into secured position and which normal tendency will be considerably augmented by centrifugal force as the wheel is rotated, consequently effecting an even tighter engagement when the wheel is rotated than when it is at rest.

Yet another object of the present invention is to provide a deformable closure member of the type described above in which the central portion is crowned or arched to provide an attractive finish appearance and which is provided with a depressed area surrounding this crowned central portion and between the central portion and the peripheral edge of the closure member which engages the rim. This depressed portion, it will be seen, serves to provide a recess which greatly facilitates the insertion of the closure member into the inwardly presenting channel of the rim.

Yet another object of the invention consists in the provision of a deformable closure member of such structure that access may be had to the interior of the rim without complete removal of the closure member. It will be appreciated that all that is necessary is to remove a portion of the peripheral edge of the closure member and deform the same in order to provide an aperture through which access may be had to the interior of the rim for inflating the tire or other purpose.

By way of modification, the present invention contemplates the provision of a metallic decoration plate which may be mounted in the deformable closure member in order to impart an attractive finish thereto and which, after installation, will form a permanent part of the closure member.

Still further, the present invention contemplates the provision of a wheel construction in which a conventional hub is provided having suitable means interconnecting the hub with the novel and improved rim. An annular closure is provided serving to bridge the space between the rim and the hub member and to provide an attractive finish for the wheel throughout this area.

Many other and further objects and advantages of the present invention will become clearly apparent from the following specification when considered in connection with the accompanying drawing forming a part thereof.

In the drawing:

Fig. 1 is a vertical sectional view through a wheel and brake assembly, constructed in accordance with the teachings of the present invention.

Fig. 2 is a fragmentary sectional view similar to Fig. 1 illustrating the manner in which the deformable closure member may be partially removed to provide access to the interior of the rim.

Fig. 3 illustrates a modified form of the invention, in which a metallic decorative plate is permanently mounted in the deformable closure member.

Fig. 4 illustrates a still further modified form of the invention in which a substantially conventional hub and rim structure is provided and a deformable closure member is utilized for the purpose of providing a finish between the hub and the rim of the wheel.

With more particular reference to the drawing, the specific embodiment of the invention disclosed therein comprises an axle housing 10, which, as is conventional in the art, has an axle 11 journaled therein by means of a suitable bearing 12. The axle 11 has a substantially circular disc or plate 13 preferably formed integrally on the end thereof and to which is secured the web of a brake drum member 14. While it will be appreciated that the brake drum member 14 may be interconnected with the axle in any suitable conventional manner, by way of illustration Fig. 1 of the drawings discloses a rabbeted annular portion preformed on the brake drum, which serves to mate with, and is secured to the disc 13 by means of an annular series of cap screws 15.

As has been described in detail in applicant's prior co-pending application referred to above, the brake drum may be formed to provide a cylindrical surface 18, which provides an annular braking area adapted to be engaged by a conventional internal expanding brake mechanism 19, which may be of conventional construction after the teachings well recognized in this general art. The outer axial end of the brake drum 18 is thickened to provide an external cylindrical braking surface 20 adapted to be engaged by an external contracting parking brake 21 of conventional construction. An annular closure member 25 may be secured to a suitable flange 26 on the axle housing 10 by means of an annular series of bolts 27, and is flanged at its peripheral edge to overlie the parking brake 21 and provide a closure for the axial end of the brake construction to prevent the entrance of dirt and foreign matter thereto and to provide in general a compact and unitary structure.

The improved rim provided for use with the structure described above, comprises a single integral sheet metal member of relatively great axial length with respect to its diameter. The marginal edges of this member are preformed to provide channels 30 presenting toward the axis of rotation of the rim, which greatly add to the rigidity and strength of the rim structure as a whole and which have further important advantages which will hereinafter be more clearly apparent. While it will be appreciated that numerous structural features of the present invention will find great and important practical utility when used with many and various types of rims, the structure herein shown and described has particular adaptability for use in connection with rims of the drop center type. Consequently, Fig. 1 of the drawing illustrates the rim construction provided with a drop center portion 31, which is of considerably less diameter than the body portion of the rim. As is conventional in the art, the rim is flanged on either side of the drop center portion 31 and it will be noted that in the particular construction shown a flange 32 on the inboard side of the drop center portion 31 is of substantially less width than a flange 33 provided on the outboard side of the drop center portion 31. It will be appreciated that this structure serves to offset the drop center portion 31 to a considerable extent with respect to the axial central plane of the rim structure as a whole. The flanges 32 and 33 each serve to support the edges of a tire 34 which may be of conventional construction. This offset drop center structure has several important advantages which will be more fully appreciated hereinafter. In the first place, due to the relatively great width of the rim, with respect to its diameter, it is essential that the drop center 31 be maintained at a predetermined maximum width in order to maintain the desired flexibility and strength characteristics of the structure as a whole. It will be appreciated if this relatively narrow drop center portion were disposed substantially centrally of the rim structure, the flanges 32 and 33 serving to support the tire 34 would be considerably wider than the flange 32 and consequently would render the removal of the tire difficult.

The rim structure as a whole is supported on the brake drum in the manner hereinafter described. A continuously extending annular member of angle section 36 has one leg thereof welded to the base of the drop center portion 31 of the rim. The opposite leg of this annular member is adapted to fit over a suitable pilot flange 38 formed on the web of the brake drum 14. This annular member is provided with an annular series of apertures through which a suitable set of cap screws 37 extend and are threadably secured into the body portion of the brake drum member 14 to demountably secure the rim thereon.

By reference to Fig. 1, it will be appreciated that inasmuch as the drop center portion of the rim is mounted upon the web portion of the brake drum, and that the brake drum structure as a whole is of considerably greater diameter than the drop center portion of the rim, it is essential that the braking surfaces of the brake drum be offset axially a considerable distance from the rim structure in order to provide an available surface for the mounting of the external contracting parking brake 21. It will be further appreciated that, due to the offset of the drop center portion 31 of the rim, the axial length of the brake drum may be decreased a substantial amount and yet provide the necessary room for the desired mounting of the external contracting parking brake 21. As has long been well appreciated, it is highly desirable that the axial lengths of brake drum structures of this general type be maintained at a minimum in order to prevent bell-mouthing and deformation of the braking surfaces thereof. Consequently, from the foregoing, it will be appreciated that the offset of the drop center portion of the rim greatly contributes toward this improved brake drum structure.

As is conventional in the art, the tire 34 has an inner tube 40 therein, which is provided with a conventional valve stem 41 extending through the drop center portion of the rim 31.

Novel means are herein provided for effecting the closure of the opened axial end of the rim member. The closure shown in detail in Fig. 1 comprises a substantially circular member formed of any suitable highly resilient and deformable material such, for example, as molded rubber. This closure member is preferably preformed to provide an arched central portion 45, which gradually slopes axially inwardly of the rim to provide an annular depressed portion 46 adjacent the outer periphery thereof. The peripheral edge of this closure member is bifurcated to provide a pair of circumferentially extending lip portions 47 and 48. As is clear by reference to Fig. 1, the lip portion 47 lies substantially in the plane of the central portion of the closure member and is adapted to enter the inwardly presented channel 30 formed in the rim. The lip portion 48 is adapted to engage a substantial area of the inner surface of the rim flange 33. Due to the arched central portion 45 and the annular depressed portion 46, it will be appreciated that the cross-sectional structure of the closure member as a whole is generally sinuous in form and consequently serves to provide a constant tendency to expand radially, which serves to aid in permanently maintaining the closure member as a whole seated in the rim. Further, it will be apparent that, due to the inwardly presenting channel structure 30, centrifugal force will tend to maintain the closure member more firmly seated in the rim when rotation of the wheel takes place than would be the case when the wheel was at rest.

Still further, it will be apparent that the annular depression 46 forms a recess, which greatly facilitates the insertion of the closure member as a whole into the rim structure and permits a person inserting the closure member to use his fingers to press the lip portion 47 radially outwardly to seat this member firmly in the recess provided by the inwardly presenting channel 30.

The manner in which the closure member may be displaced is clearly illustrated in Fig. 2 of the drawing. It will be appreciated that when it is desired to remove the closure member in order, for example, to inflate the tire, one side of the closure member may be pressed axially inwardly, thus sliding the lip 48 along the surface of the flange 33 and drawing the lip portion 47 out of the channel member 30 in which it was seated.

This axial inward pressure will serve to move a portion of the marginal edge of the closure member to substantially the dotted line position shown at 50 in Fig. 2. The lip portion 47 may then be gripped and a portion of the marginal edge of the closure member withdrawn from the rim. Due to the great flexibility and deformability of the closure member as a whole, it will be appreciated that in order to inflate the tire it is not necessary to remove the entire closure member but it is merely necessary to remove a portion of the marginal edge thereof in order to provide an aperture sufficiently large to permit of access to the interior of the rim. After a portion of the marginal edge of the closure member has been removed from engagement with the channel 30 and rim flange 33, a suitable tire inflating conduit 51 may be inserted and engaged with the valve stem 41 to inflate the tire. It will be apparent from the foregoing that the insertion and removal of the flexible closure member is relatively simple and requires no tools or other auxiliary equipment. Further, it will be appreciated that the closure thus formed is substantially water and dust proof and protects the interior portion of the rim from the access of foreign matter. Further, as the speed of the wheel is increased, due to centrifugal force, the closure member will become more and more tightly seated in engagement with the rim in which it is mounted.

If it is desired to provide a decorative surface or provide decorations on a portion of the surface of the closure member, a closure member formed in accordance with the modified form of the invention disclosed in Fig. 3 of the drawings may be used. In this form of the invention, a decorative disc of any suitable or desired shape 55 is preformed to provide outwardly presenting channels 56 at its edges which serves to engage the adjacent marginal edge of a suitable resilient closure member 57. It will be appreciated that Fig. 3 of the drawings merely illustrates one means by which a metallic decorative element may be mounted within the rubber closure member and that many and other various means conventional in the art may be utilized, as may be desired.

In the further modified form of the invention disclosed in Fig. 4, the construction shown comprises an axle housing 60 having an axle 61 journaled therein by means of suitable bearings 62. The outer end of the axle is preformed to provide a circular disc portion 63 adapted to receive a wheel web or disc 64, which serves to support the drop center rim 65. This rim, it will be noted, is constructed in substantially the same manner as the rim described in connection with the embodiment of the invention shown in Fig. 1 and is provided at its marginal edges with channels 66 presenting inwardly toward the axis of rotation of the wheel structure as a whole.

A brake drum member 67, having braking surfaces formed thereon in substantially the same manner as the braking surfaces on the brake 14 described above, is secured to the drop center portion of the rim by means of an annular angle member 68 by a suitable annular series of bolts 69.

It will be appreciated that the web portion 64 of the wheel disc is preformed to provide a hub member interiorly of which are mounted a plurality of spring clips 72, which serve together with the hub portion to provide means for displaceably mounting a hub cap 73. An annular closure member 75 is provided which has a central aperture therein adapted to seat against the wheel web and hub cap 73 and which has an outer periphery bifurcated to provide circumferentially extending lip portions 47 and 48 described above. It will be appreciated that this deformable member 75 serves to bridge the annular space between the hub cap and the rim portion of the wheel and form an attractive closure therefor. It will be noted that this closure member has a number of features in common with the closure member 45 described in connection with the preferred form of the invention, and it will likewise be appreciated that it will be retained in position by centrifugal force as the wheel is rotated and likewise may be removed and mounted in position in substantially the same manner as has been described above.

In Fig. 5 a modification of the construction shown in Figs. 1 and 2 is illustrated. A drop center rim is also employed in this modification having the drop center portion 80 and laterally projecting base portions or flanges 82 terminating at their outer margins in a conventional type of radially outwardly tire bead engaging flanges 84, no reversely bent portions such as the portions 30 previously described being employed in this instance. Instead the material of the rim adjacent the point of junction of the base portion 82 and cooperating flange 84 is formed to provide a radially inwardly directed bead portion 86 in which the bead of the tire 88 may fit. The rubber or other flexible closure 90, corresponding to the closure 45 in Figs. 1 and 2, at its periphery is provided with a radially and axially outwardly directed annular flange portion 92 and an axially inwardly directed annular flange portion 94, and between such flange portions 92 and 94 it is formed complementarily in shape to the radially inwardly directed face of the bead 86 and a portion of the radially inner face of the flange 82. Thus the flanges 92 and 94 embrace and grip the bead 86 to hold the closure 90 in place and to effect a result substantially similar to the construction shown in Figs. 1 and 2. It may be noted that the flanges 92 and 94 may have an initial bias toward each other which, when the closure 90 is applied, necessitates a slight spreading of the flanges 92 and 94 and thus tends to grip the bead 86 axially between the flanges 92 and 94. As will be apparent, as in the case of the construction shown in Figs. 1 and 2, when the closure 90 is subjected to centrifugal force during rotation of the rim, any yielding of the material of the closure 90 will tend to cause the closure 90 to more securely grip the rim. Also the closure 90 may be flexed in much the same manner as illustrated in Fig. 2 to give access to the usual tire valve stem when it is desired to inflate the tire without entirely removing the closure.

It will be appreciated that the specific embodiments of the invention herein shown and described are merely illustrative of some of the forms which the generic inventive concept defined in the subjoined claims may take. Many other and further modifications falling within the scope of the subjoined claims will be apparent to those skilled in the art.

What is claimed is:

1. A rim having an edge portion preformed to provide a circumferentially extending channel having its open side facing toward the axis of rotation of said rim and a closure member formed of rubber covering the space defined by said channel and seated therein.

2. In a wheel construction a rim and a rubber member adapted to close the axial end of said rim, said rim having a channel therein presenting toward the axis of rotation thereof and said rubber having a portion adapted to seat in said channel and a portion adapted to engage the surface of said rim.

3. In a wheel construction, a rim having a channel therein having its open side facing toward the axis of rotation thereof, a rubber closure member for closing the axial end of said rim having a peripheral portion adapted to seat in said channel, the portion of said closure member adjacent said peripheral portion being axially offset therefrom to facilitate insertion of said peripheral portion in said channel.

4. A vehicle wheel having a hub and a rim, said rim being preformed to provide an annular channel presenting toward the axis of rotation of said wheel and an annular closure member formed wholly of rubber bridging the space between said hub and rim, said closure member having a portion adapted to engage the inner surface of said rim, and a portion adapted to enter and seat in said channel.

5. A tire rim formed from sheet metal of substantially uniform thickness including a base portion having a radially inwardly directed circumferentially continuous channel intermediate the side edges thereof, a radially outwardly directed circumferentially continuous tire bead engaging flange at its axially opposite ends, a radially inwardly directed bead adjacent the point of junction of said base portion and at least one of said flanges, and a closure for said beaded end of said rim comprising a generally circular member having a pair of oppositely directed peripheral flanges adapted to embrace said bead therebetween.

6. A tire rim formed from sheet metal of substantially uniform thickness including a base portion having a radially inwardly directed circumferentially continuous channel intermediate the side edges thereof, a radially outwardly directed circumferentially continuous tire bead engaging flange at its axially opposite ends, a radially inwardly directed bead adjacent the point of junction of said base portion and at least one of said flanges, and a closure for said beaded end of said rim comprising a generally circular member having a pair of oppositely directed peripheral yieldable flanges resiliently embracing said bead therebetween.

7. In combination with a vehicle rim having a channel formed therein presenting toward the axis of rotation thereof, a closure member formed of rubber and having a bifurcated marginal edge, one of said portions being seated in said channel to retain said closure member in position upon said rim.

8. In combination with a vehicle rim preformed in its edges to provide channels presenting toward the axis of rotation thereof, and a closure member formed substantially of rubber having a portion engaging an inner surface of said rim and a portion seated in one of said channels, said closure member forming a closure for the axial end of the rim.

9. A rim and a closure member, said closure member covering the entire axial end of the opening in said rim and being formed substantially entirely of rubber and being retained therein by radial expansion of said rubber against said rim.

EMIL A. NELSON.